No. 875,019. PATENTED DEC. 31, 1907.
H. A. WAHLERT.
HOSE CLAMP.
APPLICATION FILED JULY 11, 1907.
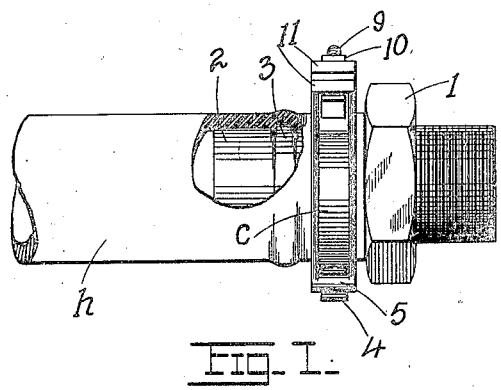
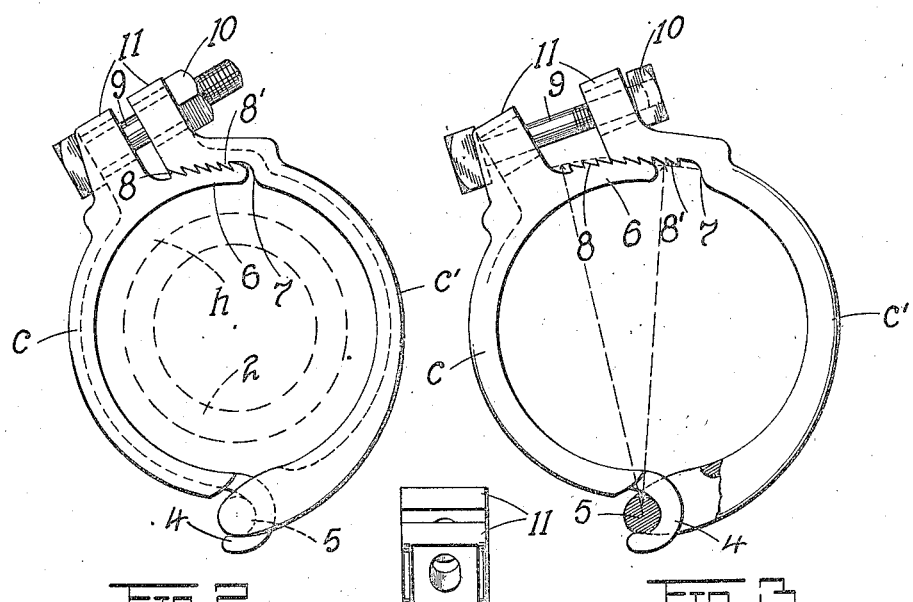
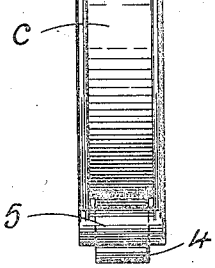
WITNESSES:
INVENTOR.
Henry A. Wahlert
BY
ATTORNEY.

UNITED STATES PATENT OFFICE.

HENRY A. WAHLERT, OF ST. LOUIS, MISSOURI.

HOSE-CLAMP.

No. 875,019.  Specification of Letters Patent.  Patented Dec. 31, 1907.

Application filed July 11, 1907. Serial No. 383,277.

*To all whom it may concern:*

Be it known that I, HENRY A. WAHLERT, a citizen of the United States, residing at St. Louis, State of Missouri, have invented certain new and useful Improvements in Hose-Clamps, of which the following is a full, clear, and exact description, reference being had to the accompanying drawings, forming a part hereof.

My invention has relation to improvements in hose-clamps; and it consists in the novel construction of clamp more fully set forth in the specification and pointed out in the claims.

In the drawings, Figure 1 is a side elevation of one member of a hose coupling, with parts broken away, showing my invention applied thereto; Fig. 2 is an end view of the clamp shown in a closed position; Fig. 3 is a similar view showing the clamp partially open; and Fig. 4 is an edge view of the clamp.

The object of my invention is to provide a clamp for securing the end of a rubber or leather or equivalent hose to the nipple of a coupling member connecting two sections of hose, though the clamp herein shown is not necessarily restricted in its application to a coupling member as it can be used for securing a hose to any tubular formation over which the hose can be passed.

A further object is to provide a clamp which will exert a maximum grip on the hose, all as will hereinafter more fully appear from a detailed description of the invention which is as follows:

Referring to the drawings, 1 represents one member of a hose coupling (of which there are many varieties) the same being provided with a tubular nipple or stem 2 preferably with an annular bead or peripheral enlargement 3 to insure a firm grip on the hose $h$ passed over the nipple. The clamp forming the subject matter of the present invention is applied to the hose between the bead 3 and the polygonal head of the coupling member. This clamp is preferably composed of two sections $c$ $c'$ respectively, separable at what constitutes the hinge joint, said joint comprising an outwardly curved finger or claw 4 on one end of the section $c$ (which may be termed the male section), passed through an opening of the female section $c'$ and engaging the rounded terminal wall 5 of said opening, said wall serving as a hinge pin for the joint. The opposite end of the section $c$ terminates in a nose 6 which is limited in one direction by the shoulder formation 7 on the section $c'$. The outer surface of the nose is provided with serrations or teeth 8 which engage corresponding teeth 8' on the under surface of the adjacent terminal of the section $c'$.

The inner curved surfaces of the sections $c$, $c;$ are described from the center or axis of the clamp, (Fig. 2) but the arc or curve defining the path of disposition of the teeth 8, 8', is swung from the hinge joint as a center (Fig. 3). The purpose of this is obvious, and its object is to secure perfect and uniform engagement of the teeth 8' with the teeth 8 as the female clamp section $c'$ is swung toward and over the nose 6 of the male in the act of clamping the hose $h$ to the nipple 2. Once the necessary grip is obtained, the interlocked teeth prevent the clamp sections from slipping or loosening under the tension exerted by the compressed elastic hose, and the two sections can be permanently secured by the locking bolt 9 and nut 10, the bolt being passed through the lugs 11, 11 of the respective sections. The teeth 8, 8' are on the order of ratchet teeth, the female section slipping freely over the male by a closing movement of the sections, but locking for an opening or expanding movement. Of course the sections need not necessarily be separable at the joint.

Having described my invention what I claim is:

1. A hose-clamp comprising two sections hinged at one end, lugs terminating the opposite ends, a nose formation on one of the sections having serrations disposed on its outer surface, corresponding serrations formed on the inner surface of the opposite section, said serrations being disposed along an arc described from the joint between the sections as a center, substantially as set forth.

2. A hose clamp comprising two substantially semi-circular sections hinged together at one end, their inner surfaces being disposed about arcs described from the center of the clamp, lugs terminating the opposite ends of the sections, a nose formation extending beyond the lug of one section and having outer ratchet teeth disposed transversely to the plane of oscillation of the sections, a shoulder on the opposite section for engaging the end of the nose, a similar series of ratchet teeth formed on the inner surface of the opposite section for engaging the teeth on the nose aforesaid, the edges of the teeth being disposed along a curve described from the hinge-joint of the sections as a center, substantially as set forth.

In testimony whereof I affix my signature, in presence of two witnesses.

HENRY A. WAHLERT.

Witnesses:
  EMIL STAREK,
  T. EVANS.